(12) United States Patent
Klinkhammer

(10) Patent No.: US 12,011,727 B2
(45) Date of Patent: Jun. 18, 2024

(54) SWITCHING APPARATUS FOR HIGH PRESSURE TOOLS AND CLEANING APPARATUS HAVING SUCH A SWITCHING APPARATUS

(71) Applicant: ECOCLEAN GMBH, Filderstadt (DE)

(72) Inventor: Norbert Klinkhammer, Roetgen (DE)

(73) Assignee: ECOCLEAN GMBH, Filderstadt (DE)

( * ) Notice: Subject to any disclaimer, the term of this patent is extended or adjusted under 35 U.S.C. 154(b) by 442 days.

(21) Appl. No.: 17/489,372

(22) Filed: Sep. 29, 2021

(65) Prior Publication Data
US 2022/0016647 A1    Jan. 20, 2022

Related U.S. Application Data

(63) Continuation of application No. PCT/EP2020/059273, filed on Apr. 1, 2020.

(30) Foreign Application Priority Data

Apr. 2, 2019  (DE) .......................... 102019108512.8

(51) Int. Cl.
*B05B 1/16*  (2006.01)
*B05B 1/30*  (2006.01)
(Continued)

(52) U.S. Cl.
CPC ............ *B05B 1/1645* (2013.01); *B05B 1/169* (2013.01); *B05B 1/3006* (2013.01); *B08B 3/024* (2013.01);
(Continued)

(58) Field of Classification Search
None
See application file for complete search history.

(56) References Cited

U.S. PATENT DOCUMENTS 5,535,496 A    7/1996  Sugino et al.
9,643,218 B2   5/2017  Haremaki et al.
(Continued)

FOREIGN PATENT DOCUMENTS

CA    2611732    5/2009
DE    4205273    12/1992
(Continued)

OTHER PUBLICATIONS

Official Action for German Patent Application No. 102019108512.8, dated Nov. 20, 2020, 6 pages.
(Continued)

*Primary Examiner* — Spencer E. Bell
(74) *Attorney, Agent, or Firm* — Sheridan Ross P.C.

(57) ABSTRACT

The invention relates to a switching apparatus for high pressure tools, comprising a holding device and two or more high pressure tools for cleaning purposes, a drive device, and a rotary body that is rotatable relative to the holding device about an axis of rotation by means of said drive device, an adjusting device with which one of the high pressure tools is selectively transferable from an inoperative position into an operating position, in which operating position the high pressure tool is coupled to the rotary body in a rotationally fixed manner and is rotationally drivable about a tool axis by way of said rotary body, wherein the switching apparatus comprises or forms a supply channel for pressurized cleaning liquid and the respective high pressure tool comprises or forms a tool channel for cleaning liquid, which is in flow connection or can be brought into flow connection with the supply channel during operation, wherein the switching apparatus further comprises a valve device with which the supply channel is selectively unblockable and closable, wherein the supply channel is formed in (Continued)

the rotary body at least in sections and the valve device is arranged on the rotary body.

20 Claims, 11 Drawing Sheets

(51) Int. Cl.
*B05B 13/06* (2006.01)
*B08B 3/02* (2006.01)
*B25J 15/00* (2006.01)

(52) U.S. Cl.
CPC ....... *B25J 15/0019* (2013.01); *B05B 13/0636* (2013.01); *B08B 2203/027* (2013.01)

(56) References Cited

U.S. PATENT DOCUMENTS

| | | | |
|---|---|---|---|
| 2012/0080060 A1 | 4/2012 | Haremaki et al. | |
| 2012/0204368 A1 | 8/2012 | Zink | |
| 2015/0075573 A1* | 3/2015 | Hirasaka | B23B 29/323 |
| | | | 408/35 |
| 2018/0214916 A1* | 8/2018 | Fukurotani | B08B 5/02 |

FOREIGN PATENT DOCUMENTS

| | | |
|---|---|---|
| DE | 19926381 | 11/2000 |
| EP | 2047912 | 4/2009 |
| EP | 2656922 | 10/2013 |
| EP | 2848324 | 8/2018 |
| KR | 101743029 | 7/2017 |

OTHER PUBLICATIONS

International Search Report and Written Opinion for International (PCT) Patent Application No. PCT/EP2020/059273, dated Aug. 27, 2020, 10 pages.

English Translation of the International Search Report for International (PCT) Patent Application No. PT/EP2020/059273, dated Aug. 27, 2020, 2 pages.

Official Action (no English translation) for China Patent Application No. 202080027145.4, dated Feb. 17, 2023, 10 pages.

International Preliminary Report on Patentability for International (PCT) Application No. PCT/EP2020/059273, dated Oct. 14, 2021, 9 pages.

* cited by examiner

SWITCHING APPARATUS FOR HIGH PRESSURE TOOLS AND CLEANING APPARATUS HAVING SUCH A SWITCHING APPARATUS

CROSS-REFERENCE TO RELATED APPLICATIONS

This application is a continuation application of international application number PCT/EP2020/059273, filed on Apr. 1, 2020, and claims the benefit of German application number 10 2019 108 512.8, filed on Apr. 2, 2019, which are incorporated herein by reference in their entirety and for all purposes.

FIELD OF THE INVENTION

The present invention relates to a switching apparatus for high pressure tools and to a cleaning apparatus comprising at least one switching apparatus.

BACKGROUND OF THE INVENTION

Embodiments of switching apparatuses of that kind are described, e.g., in EP 2 047 912 A1, U.S. Pat. No. 9,643,218 B2 and EP 2 848 324 B1.

The present invention further relates to a cleaning apparatus with at least one switching apparatus of this kind.

A switching apparatus of the kind stated at the outset is used, e.g., to clean workpieces, for example to remove particulate and/or film-like residues or contamination following manufacturing. It is known that depending on the cleaning purpose and with regard to the desired cleaning result, one of the two or more high pressure tools, which, in particular, may be constituted in different ways with respect to their cleaning properties, is transferred into the operating position. In the operating position, typically there is a flow connection from a pump unit via the supply channel and the tool channel to at least one nozzle of the high pressure tool. Cleaning liquid, in particular water, to which a cleaning chemical may be added to increase the cleaning effect, is dispensed via the at least one nozzle and acts on the workpiece. The high pressure tool can be selected by way of the adjusting device, "inoperative position" in this case referring only to a distinction with regard to the "operating position". Provision may certainly be made that a high pressure tool fulfills a purpose in its inoperative position. In the operating position, it is possible to set the high pressure tool into rotation by means of the drive device using the rotary body, though this does not have to be absolutely necessary for the cleaning.

The high pressure tools are, e.g., of lance-shaped configuration at least in sections and can in this way be inserted into cavities of the workpiece for internal cleaning purposes. For example, nozzles positioned around the tool axis or a nozzle plate arranged on the face side may be provided in a high pressure tool. The high pressure tools may have one or more nozzles.

It is an object of the present invention to provide a switching apparatus with which a compact structure can be achieved with a constructively simple configuration.

SUMMARY OF THE INVENTION

In a first aspect of the invention, a switching apparatus for high pressure tools comprises a holding device and two or more high pressure tools for cleaning purposes, a drive device, and a rotary body that is rotatable relative to the holding device about an axis of rotation by means of said drive device. The switching apparatus further comprises an adjusting device with which one of the high pressure tools is selectively transferable from an inoperative position into an operating position, in which operating position the high pressure tool is coupled to the rotary body in a rotationally fixed manner and is rotationally drivable about a tool axis by way of said rotary body. The switching apparatus comprises or forms a supply channel for pressurized cleaning liquid and the respective high pressure tool comprises or forms a tool channel for cleaning liquid, which is in flow connection or can be brought into flow connection with the supply channel during operation. The switching apparatus further comprises a valve device with which the supply channel is selectively unblockable and closable. The supply channel is formed in the rotary body at least in sections and the valve device is arranged on the rotary body.

In a second aspect of the invention, a cleaning apparatus comprises at least one switching apparatus in accordance with the first aspect and a pump unit that is in flow connection or is bringable into flow connection with the supply channel of the switching apparatus.

BRIEF DESCRIPTION OF THE DRAWINGS

The foregoing summary and the following description may be better understood in connection with the drawing figures, of which.

DETAILED DESCRIPTION OF PREFERRED EMBODIMENTS OF THE INVENTION

Figure 1:
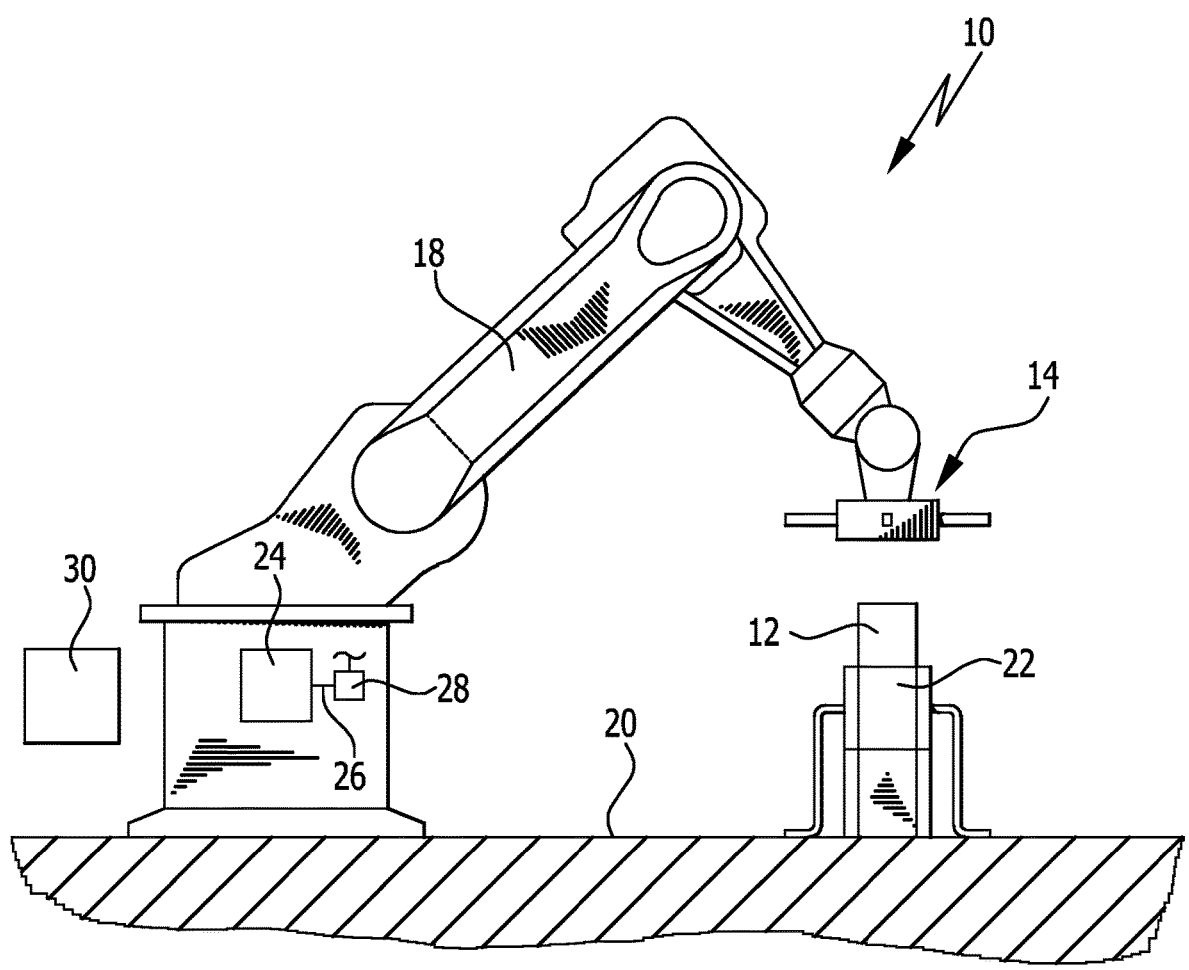
FIG. 1: shows a schematic depiction of a cleaning apparatus for cleaning workpieces by means of a pressurized cleaning liquid, wherein the cleaning apparatus comprises a robotic arm for moving a switching apparatus in accordance with the invention.

Although the invention is illustrated and described herein with reference to specific embodiments, the invention is not intended to be limited to the details shown. Rather, various modifications may be made in the details with the scope and range of equivalents of the claims and without departing from the invention.

The present invention relates to a switching apparatus for high pressure tools, comprising a holding device and two or more high pressure tools for cleaning purposes, a drive device and a rotary body that is rotatable relative to the holding device about an axis of rotation by means of said drive device, an adjusting device with which one of the high pressure tools is selectively transferable from an inoperative position into an operating position, in which operating position the high pressure tool is coupled to the rotary body in a rotationally fixed manner and is rotationally drivable about a tool axis by way of said rotary body, wherein the switching apparatus comprises or forms a supply channel for pressurized cleaning liquid and the respective high pressure tool comprises or forms a tool channel for cleaning liquid, which is in flow connection or can be brought into flow connection with the supply channel during operation, wherein the switching apparatus further comprises a valve device with which the supply channel is selectively unblockable and closable, and wherein the supply channel is formed in the rotary body at least in sections and the valve device is arranged on the rotary body.

In the switching apparatus in accordance with the invention, provision is made that the supply channel via which the cleaning liquid can be supplied is formed at least partially in the rotary body. In addition, the valve device is arranged on the rotary body. This makes it possible to unblock or block the supply of cleaning liquid to the high pressure tool adopting the operating position by means of the valve device on the rotary body itself. When a respective high pressure tool adopts the operating position, it is possible as a result thereof to provide the rotation by means of the drive device by way of the rotary body and to control the supply of cleaning liquid through the rotary body for the respective high pressure tool adopting the operating position. As a result, it is thereby possible to give the switching apparatus a compact structure, because separate valve devices for the respective high pressure tools can preferably be dispensed with. The space requirement for additional valve devices, as are required, e.g., for the switching apparatus described in the publication U.S. Pat. No. 9,643,218 B2 stated at the outset, is not necessary. As a result, the switching apparatus can also be given a simple constructive configuration. This has advantages with respect to manufacturing costs, assembly, reliability, and/or maintenance.

In the operating position of the high pressure tool, the adjusting device holding said high pressure tool is preferably locked and held in position by means of the valve device. In this way, an additional locking, as is required in the switching apparatus described in EP 2 848 324 B1, can be dispensed with.

The switching apparatus comprises, in particular, a rotary passage for cleaning liquid from the holding device to the high pressure tool—a sealing device mentioned in the following advantageously being active here—, wherein the rotary passage with the valve device arranged on the rotary body can advantageously be unblocked in a targeted manner for supplying cleaning liquid or, on the contrary, be blocked.

In a preferred embodiment, the valve device may advantageously be arranged at least partially in the rotary body. For this purpose, the rotary body is configured, e.g., as a sleeve through which a portion of the supply channel extends. The valve device can be inserted into the rotary body and be fixed thereto, for example by means of a holding element.

For example, it is favorable if the valve device does not project beyond an end side of the rotary body, thereby making it possible to reduce the likelihood of an external influence on the valve device and the valve device is thereby better protected.

Provision may be made that the rotary body comprises the valve device.

The portion of the supply channel is favorably a through-channel of the rotary body, which may be of rectilinear configuration, for example. In a preferred embodiment, the through-channel is flow connected upstream to a portion of the supply channel that is formed in the holding device or comprised thereby. The connection is effected, in particular, with the interposition of a sealing device, wherein a high pressure sealing packing may advantageously be provided. In this way, a sealed rotary passage between the holding device and the rotary body can be formed.

To avoid sealing faces that move and, in particular, rotate relative to one another, it is preferable if the valve device is coupled to the rotary body in a rotationally fixed manner.

It proves to be advantageous if the rotary body is aligned coaxially to the high pressure tool in the operating position thereof. By aligning the axis of rotation and a tool axial to one another, imbalances in the rotation of the high pressure tool can preferably be avoided.

In particular, it is favorable if the portion of the supply channel formed in the rotary body is aligned coaxially to the tool channel in the operating position of the high pressure tool.

To achieve a constructively simple configuration, provision is favorably made that the valve device is configured to be self-opening under the action of pressurized cleaning liquid and/or configured to be self-closing. In a preferred embodiment, the valve device is thus pressure-actuable by means of pressurized cleaning liquid. During operation, for example, a separate valve device (for example a magnet valve) releases the cleaning liquid pressurized by means of a pump unit, said cleaning liquid acting upon the supply channel and transferring the valve device on the rotary body into an unblocking position. A restoring device may be provided in order to transfer the valve device back into a sealing position when the pressure decreases.

It is advantageous if the valve device comprises a control body that is movable relative to the rotary body and in a base position closing the supply channel abuts against an abutment element of the rotary body and in an alignment position is raised from the abutment element, wherein the control body comprises or forms a valve body or such a one is arranged on the control body, which valve body in the alignment position of the rotary body sealingly abuts against a valve seat of the tool channel and in the base position is raised from said valve seat. In practice, it proves to be advantageous if, in particular, an alignment and, in particular, centering of the supply channel extending, e.g., through the control body and the valve body relative to the tool channel can be achieved in this way. This applies, in particular, in consideration of typical operating parameters of the switching apparatus of, e.g., an operating pressure of about 150 bar and above, wherein the operating pressure may be up to about 500 bar and above, for example about 600 bar. When the control body is acted upon with cleaning liquid, a movement can take place, for example a displacement relative to the rotary body. The valve body comes into abutment against the valve seat of the tool channel. In this way, it is ensured that the supply channel adopts the correct desired position relative to the tool channel.

Due to the above configuration, a locking of the high pressure tool on the valve seat is preferably achieved as a result of the sealing abutment of the valve body against the valve seat, such that a separate locking for the high pressure tool in the operating position can be dispensed with.

Here, it is favorable if the control body is transferable into the alignment position at a low pressure of the cleaning liquid in comparison to the operating pressure. In one implementation of the valve device, for example, about 5 bar to 10 bar is sufficient to move the control body.

Considering that the operations of the switching apparatus preferably occur quickly, the embodiment described above proves to be particularly advantageous. For example, a change of the high pressure tool can be performed in less than about one second, wherein 0.5 seconds or less are a typical value in practice, for example about 0.4 seconds. The pressure buildup commencing from the pump unit may be less than about 0.5 seconds, for example about 0.1 seconds. It is therefore advantageous if a correct relative position of the supply channel and the tool channel can be ensured before the high pressure tool is loaded with the full operating pressure.

The preceding statements make clear, in particular, that the control body is advantageously transferable into the alignment position by means of pressurized cleaning liquid.

Provision may be made that the valve body is formed separately from the control body and is connected thereto.

In an embodiment of a different kind, provision may be made that the valve body is formed as one piece with the control body.

It proves to be advantageous if the valve body comprises or forms a sealing cone that engages into a cone receptacle on the tool channel, or vice versa. This makes it easier to align the valve body and the valve seat relative to one another.

Provision may be made that an adjusting unit of the adjusting device is briefly deactivated or switched into a passive state upon transferring into the alignment position. In this way, the high pressure tool is given sufficient play in order to ensure the alignment relative to the control body.

Provision may be made that the adjusting unit is switched into a passive state during the cleaning operation of the high pressure tool in the operating position and is activated only for the tool change.

The control body is advantageously transferable from the sealing position into the alignment position against the action of a restoring device. When the pressure of the cleaning liquid is no longer being applied, in particular for changing the high pressure tool, the control body can in this way readopt the sealing position.

The restoring device is advantageously mechanically configured in a constructively simple manner and preferably comprises or forms an elastically deformable restoring element. The restoring element is, e.g., a coil spring that is supported on the rotary body and acts upon the control body with a restoring force in the direction of the base position. The restoring device is, in particular, designed corresponding to that pressure which is required for the above movement of the control body into the alignment position, i.e., for example, for the aforementioned pre-pressure of about 5 bar to 10 bar.

The control body may be configured, e.g., as a hollow body that is arranged in the rotary body so as to be axially displaceable. In particular, the valve body referred to in the following may be arranged in the control body, which valve body may be positioned coaxially to the control body and the rotary body.

The control body may be configured, in particular, as a control piston.

It proves to be advantageous if the valve device comprises or forms a valve body that is movable relative to the control body. In a sealing position closing the supply channel, the valve body advantageously sealingly or substantially sealingly abuts against a valve seat of the control body and in an unblocking position is raised from the valve seat, unblocking the supply channel. The valve body unblocks the supply channel, in particular, only after the control body has been transferred into the alignment position. Accordingly, in particular, a pressure holding valve is formed by way of the valve body and the valve seat, which pressure holding valve can still be closed at the above mentioned pre-pressure.

The valve body is favorably transferable into the unblocking position by means of pressurized cleaning liquid, wherein a higher pressure of the cleaning liquid is required for this than for transferring the control body from the base position into the alignment position. The valve body is, in particular, transferred into the unblocking position upon reaching an operating pressure of, e.g., about 600 bar.

The opening behavior of the valve body relative to the behavior of the control body can be set, in particular, by way of their respective area that can be acted upon by the pressure of the cleaning liquid and/or by way of a respective restoring device.

It is advantageous if the control piston is further acted upon with a force upon increasing pressure of the cleaning liquid, whereby a reliable sealing in the region of the valve body and valve seat on the high pressure tool can be achieved. At the same time, the alignment of said valve body on the valve seat of the high pressure tool is ensured even with increasing operating pressure.

It is favorable according to the above if the valve body adopting the sealing position abuts against the valve seat of the control body when said valve body is moved relative to the rotary body from the base position into the alignment position.

The control body may be configured as a hollow body in which the valve body aligned coaxially thereto is arranged. The valve body may be supported, in particular, on the aforementioned valve body of the control body by means of a restoring element.

The valve body is favorably transferable from the sealing position into the unblocking position against the action of a restoring device. The restoring device is preferably mechanically configured in a constructively simple manner and comprises or forms an elastically deformable restoring element. The restoring element may be, e.g., a coil spring that is supported on the valve body and indirectly or directly on the control body.

The switching apparatus advantageously comprises at least one bearing device.

The base body is advantageously directly or indirectly mounted by way of at least one bearing device so as to be rotatable relative to the holding device.

Alternatively or in addition, provision is preferably made that the high pressure tool is directly or indirectly mounted by way of at least one bearing device so as to be rotatable relative to the adjusting device.

It is favorable if at least one bearing device comprises or forms a radial bearing relative to the axis of rotation and/or the tool axis. Radial forces relative to the axis of rotation and/or the tool axis can be absorbed by way of the radial bearing.

It is advantageous if at least one bearing device comprises or forms an axial bearing relative to the axis of rotation and/or the tool axis. Axial forces, in particular forces for achieving a seal between the valve device and the high pressure tool, can be absorbed in this way.

It proves to be advantageous if a first bearing device and a second bearing device are provided, which are configured as or comprise axial bearings set against one another. By way of cooperating axial bearings, for example, the alignment of the valve body on the control piston relative to the valve seat of the high pressure tool and the required seal at this position can be ensured.

In a preferred embodiment, the aforementioned bearing devices are, in particular, tapered roller bearings with which a radial mounting can be achieved in addition to the axial mounting.

It is advantageous if the switching apparatus comprises at least one sealing device.

For example, a high pressure seal is provided, which seals between the rotary body and the holding device. The high pressure seal may comprise or be configured as, e.g., a high pressure sealing packing. The sealing packing is positioned, e.g., between the rotary body and an inflow sleeve that forms a portion of the supply channel and engages into the rotary body. The sealing packing is, e.g., of annular configuration and is fixed in an opening of the rotary body by means of a holding element, wherein the inflow sleeve engages into the rotary body radially on the inside of the sealing packing.

Alternatively or in addition to the sealing packing, for example, a labyrinth seal, a slide ring seal, or a different kind of high pressure seal is used.

It is advantageous if at least one sealing element is provided, which seals a bearing device for bearing the rotary body relative to the holding device. For example, the sealing element is configured as or comprises a shaft sealing ring, which seals directly or indirectly between the rotary body and the holding device.

In a corresponding manner, at least one sealing element may be provided, which seals a bearing device for bearing the high pressure tool relative to the adjusting device, wherein the sealing element may comprise or may be configured as a shaft sealing ring.

In a preferred embodiment, the rotary body may be formed in one piece. Alternatively, a production in multiple pieces is conceivable.

The drive device for the rotary body advantageously comprises a drive element that is coupled to the rotary body in a rotationally fixed manner and can be acted upon with a drive force by way of a drive unit.

The drive element is favorably configured as a drive wheel that surrounds the rotary body and is drivable directly or indirectly by the drive unit. For example, provision may be made that at least one further drive wheel is present, by way of which the drive wheel is drivable.

The at least one drive wheel is, e.g., a toothed wheel, and in the case of a plurality of toothed wheels, same may mesh with one another to transmit the drive force to the rotary body. Alternatively, friction wheels that roll on one another may be provided. The use of a tensile force transmission element, for example a toothed belt or a chain, is also conceivable.

The use of the drive wheel, in particular the toothed wheel, is advantageous with regard to a simpler and faster assembly and/or disassembly of the rotary body.

The at least one further drive wheel is favorably rotatably mounted on the holding device, and the drive unit is preferably fixed to the holding device.

The drive unit favorably comprises or forms a drive shaft, which is aligned in parallel or substantially in parallel to the axis of rotation. In this way, a compact structure of the switching apparatus can be achieved. The force transmission from the drive shaft may be effected by way of two or more drive wheels, which are advantageously positioned in a common plane.

It proves to be favorable if the holding device comprises a base body in which a receptacle for the rotary body and the valve device is formed, wherein the rotary body is directly or indirectly rotatably mounted relative to the base body by way of at least one bearing device.

The base body may, in particular, comprise or form a portion of the supply channel.

The base body may be of one-part or multi-part configuration.

It is advantageous if the switching apparatus comprises a receiving part that accommodates the rotary body, the valve device, and the at least one bearing device, which together with the receiving part form a pre-assembled assembly that is removable as a whole from the receptacle and/or insertable as a whole into the receptacle. This proves to be particularly advantageous with regard to an assembly and the maintenance of the switching apparatus. An assembly comprises a one-part or multi-part receiving part in which the rotary body, the valve device, and at least one bearing device for bearing the rotary body relative to the receiving part are arranged. The receiving unit may also comprise a drive wheel of the drive device, which is coupled to the rotary body in a rotationally fixed manner. This assembly can be inserted pre-assembled into the receptacle. For maintenance purposes, the assembly can preferably be removed as a whole from the receptacle. The assembly forms, in particular, a rotary passage of the switching apparatus.

In particular, the switching apparatus comprises or forms a so-called "revolver" for the high pressure tools as a result of the rotatable adjusting element.

The adjusting device advantageously comprises or forms an adjusting element that is rotatable relative to the holding device about an axis of rotation by means of an adjusting unit for transferring a respective high pressure tool into the operating position. The axis of rotation is advantageously aligned transversely and, in particular, perpendicularly to the axis of rotation of the rotary body. The adjusting element may be of annular configuration or have an annular portion on which the two or more high pressure tools are held. A drive element may be arranged or formed on the adjusting element, which drive element cooperates with a corresponding drive element of the adjusting unit. For example, an annular drive element is provided, which meshes with a bevel gear of the adjusting unit by way of a bevel gear toothing.

It is advantageous if the adjusting device comprises or forms an adjusting element and a respective tool holding part that is associated with a high pressure tool and is fixed to the adjusting element, and if the respective tool is rotatably mounted relative to the tool holding part by way of a bearing device. The tool holding part is, e.g., firmly fixed to the adjusting element and the at least one bearing device enables the rotatable mounting of the high pressure tool.

The switching apparatus in accordance with the invention has two or more high pressure tools. In a preferred embodiment, provision may be made that the two or more high pressure tools belong to a first group of high pressure tools, which can selectively be transferred into the operating position. An embodiment of that kind may advantageously comprise a second group of two or more high pressure tools, which can selectively be transferred into an operating position.

It is favorable if the two or more high pressure tools form a first group of high pressure tools of the switching apparatus and if the switching apparatus comprises a further group of two or more high pressure tools, with which a further rotary body that is rotatable relative to the holding device about a further axis of rotation by means of the drive device is associated, wherein one of the high pressure tools of the further group of high pressure tools is selectively transferable from an inoperative position into an operating position by means of the adjusting device, in which operating position the high pressure tool is coupled to the further rotary body in a rotationally fixed manner and is rotationally drivable about a further tool axis by way of said rotary body, wherein the switching apparatus comprises or forms a further supply channel for pressurized cleaning liquid and the respective high pressure tool of the further group of high pressure tools comprises or forms a tool channel for cleaning liquid, which is in flow connection or can be brought into flow connection with the further supply channel during operation, wherein the switching apparatus further comprises a further valve device with which the further supply channel is selectively unblockable and closable, wherein the further supply channel is formed in the further rotary body at least in sections and the further valve device is arranged on the further rotary body.

In a switching apparatus of that kind, those advantages that are achieved with the switching apparatus in accordance with the invention and were described above can also be achieved for the second group of high pressure tools. As a result of the arrangement of the valve device on the rotary body and of the supply channel in the rotary body, the supply of cleaning liquid can be unblocked or blocked on the rotary body itself. This enables a compact construction, because separate valve devices for the respective high pressure tools can preferably be dispensed with.

As a result of the additional high pressure tools of the second group, the cycle time in the cleaning and/or machining of workpieces can be reduced by increasing the number of workpieces machined and/or cleaned per unit of time. For example, it is possible to machine and/or clean two workpieces simultaneously with in each case one of the high pressure tools adopting the operating position. The workpieces may, for example, be mounted on a common receiving device and be acted upon by in each case one of the high pressure tools.

Features of preferred embodiments of the switching apparatus in accordance with the invention, explained with the example of the first group of high pressure tools, may be partially or entirely present and implemented in the case of the second group of high pressure tools as well. Reference is made to the preceding statements in this regard.

Provision may be made that the rotary bodies are arranged with axes of rotation aligned in parallel to one another.

Alternatively or in addition, provision is preferably made that a respective high pressure tool of the first group and a respective high pressure tool of the second group are each arranged with tool axes aligned in parallel to one another.

It is favorable if the high pressure tools of the first group and the high pressure tools of the second group are arranged axially next to one another in relation to an axis of rotation of the adjusting device, in particular of the adjusting element as described above. High pressure tools arranged next to one another preferably jointly adopt the respective operating position. This makes it possible to machine and/or clean workpieces placed next to one another.

The spacing of high pressure tools arranged next to one another may be, e.g., about 90 mm to 120 mm.

The high pressure tools of the first group and the high pressure tools of the second group are favorably arranged at the same positions in the circumferential direction of an axis of rotation of the adjusting device, in particular of the adjusting element as described above. When rotating the adjusting device relative to the holding device, it is possible, in particular, that a respective high pressure tool of the first and the second group adopts the operating position or the inoperative position.

Provision is favorably made that high pressure tools of the first group and the second group, which each adopt the operating position, are of identical configuration. The high pressure tools are hereby preferably arranged axially next to one another and at the same positions in the circumferential direction of the axis of rotation of the adjusting device.

The supply channel and the further supply channel preferably open upstream of the rotary bodies into one another and together can be acted upon with the cleaning liquid. For example, a portion of a supply channel preferably extends in the base body and branches into two supply channels or supply channel portions, which are associated with a respective rotary body and are, e.g., through-channels of the rotary body.

The rotary body and the further rotary body are advantageously directly or indirectly coupled by way of at least one drive element of the drive device. This enables a common, preferably synchronous movement of the high pressure tools of the two groups.

In a preferred embodiment, the rotary bodies may each be coupled to a drive wheel in a rotationally-fixed manner, wherein a further drive wheel in engagement with the drive wheels is provided. The drive wheels are, for example, toothed wheels, wherein, e.g., a drive and, in particular, toothed wheel arranged between the two rotary bodies is preferably provided for coupling. Alternatively, friction wheels rolling on one another may be provided. The transmission of the drive force via a drive wheel arranged between the rotary bodies makes it possible to rotate both rotary bodies in the same direction of rotation.

As described above, a receptacle for the rotary body and the valve device is preferably provided in the base body, wherein an assembly can favorably be inserted preassembled into the receptacle. It proves to be advantageous, in particular, if the components that are associated with the second group of high pressure tools are configured in a corresponding manner.

Thus, it is advantageous if a further receptacle for the further rotary body and the further valve device is formed in the base body, wherein the further rotary body is directly or indirectly rotatably mounted relative to the base body by way of at least one bearing device.

The switching apparatus advantageously comprises a further receiving part that accommodates the further rotary body, the further valve device, and the at least one bearing device, which together with the further receiving part form a further pre-assembled assembly that is removable as a whole from the further receptacle or is insertable as a whole into same. This proves to be particularly advantageous with regard to an assembly and the maintenance of the switching apparatus. The assembly may comprise a drive wheel of the drive device, which is coupled to the rotary body is a rotationally fixed manner. If two such assemblies are provided, a drive wheel coupling the drive wheels is preferably rotatably mounted between the assemblies in the base body.

The assembly and the further assembly are preferably of identical configuration.

The switching apparatus in accordance with the invention is suitable, in particular, for cleaning and/or machining workpieces in the field of mechatronics, electronics, and/or made of plastic, in the wood or furniture industry or for cleaning generatively manufactured workpieces. The application of the switching apparatus is not limited to this, however. Overall, for example, workpieces made of metal, ceramic, or plastics can be cleaned and/or machined. The workpieces may be, e.g., engine parts or transmission parts, for example cylinder heads, cylinder crankcases, housings, wheels, or shafts. The workpieces may be, e.g., components for electric motors, like, for example, coil bodies, housings, bearings, or shafts. The workpieces may come from the field of medical technology and be implants, for example. The use of the high pressure tool for workpieces made of different materials (hybrid workpieces) is also conceivable. Aside from dry particulate contamination, larger machining residues can also be cleaned off, for example chips, blasting agent, casting core residues or tinsel burrs. Film-like contamination like, e.g., due to cooling lubricant, oils, grease, release agents or abrasives or production residues, for example from plastics processing, can preferably also be removed.

The present invention relates also to a cleaning apparatus that has at least one switching apparatus of the kind stated above.

The cleaning apparatus may, in particular, comprise a pump unit that is in flow connection or is bringable into flow connection with the supply channel of the switching apparatus for the provision of a cleaning liquid.

The cleaning apparatus may have at least one adjusting device for moving the switching apparatus. In particular, a translational and/or rotational movement of the switching apparatus may be possible, for example in six degrees of freedom. An adjustment by means of a robotic arm or by way of CNC axes is conceivable. Alternatively, a rigid attachment of the switching apparatus may be provided.

FIG. 1 shows an advantageous embodiment, denoted with the reference numeral 10, of a cleaning apparatus in accordance with the invention for cleaning a workpiece 12. The cleaning apparatus 10 comprises a preferred embodiment of the switching apparatus in accordance with the invention, which is denoted as a whole with the reference numeral 14 and is explained in the following, in particular with reference to FIGS. 2 to 8.

The cleaning apparatus 10 comprises an adjusting device 16, which presently comprises a robotic arm 18 on a supporting surface 20, for moving the switching apparatus 14. By way of the adjusting device 16, the switching apparatus 14 can be moved translationally and rotationally relative to the workpiece 12, for example in six degrees of freedom.

In the present example, the workpiece 12 is held stationarily on a receiving device 22. It is also conceivable, however, that the workpiece 12 is also movable by means of an adjusting device that is not depicted. The switching apparatus 14 may also be arranged stationarily.

The cleaning apparatus 10 comprises a schematically depicted pump unit 24 for providing a pressurized cleaning liquid. The cleaning liquid can be supplied to the switching apparatus 14 by way of a fluid conduit 26. The fluid conduit 26 can selectively be unblocked and blocked by means of a valve device 28.

The cleaning apparatus 10 comprises a control device 30 for controlling and/or regulating the operation, in particular for controlling the pump unit 24, the valve device 28, the components of the switching apparatus 14, and the adjusting device 16.

The switching apparatus 14 comprises a holding device 32 by way of which the switching apparatus 14 is presently fixed to the robotic arm 18, as well as an adjusting device 34 with a multitude of high pressure tools 36 held thereon.

The switching apparatus 14 forms a so-called "revolver" for the high pressure tools 36.

The holding device 32 comprises or forms by way of a base body 38 a pedestal or base for an adjusting element 40 of the adjusting device 34. The adjusting element 40 covers the base body 38 from a side 42 thereof. The adjusting element 40 is thus presently approximately of cap-like or cover-like configuration with a peripheral wall 44 and a cover wall 46 arranged on the side 42. The adjusting element 40 defines an axis of rotation 48 and is rotatable about same relative to the holding device 32. Bearing devices 50, 52 serve to mount the adjusting element 40 on the holding device 32.

For rotating the adjusting element 40, the adjusting device 34 comprises an adjusting unit 54, which comprises, e.g., a stepping motor or servo motor. In the present case, the adjusting element 40 has on a side opposite the side 42 a toothing 56, which is in engagement with a toothing on the adjusting unit 54 that is not depicted in the drawing. In this case, said toothing is a bevel gear toothing.

The adjusting element 40 may presently be considered to be, in particular, a rotor 58 that is rotatable relative to a stator 60, wherein the stator 60 is presently formed by the holding device 32 and, in particular, the base body 38.

A plurality of high pressure tools 36 are held on the rotor 58, which differ from one another with respect to their cleaning properties, for example in the form, orientation, and number of one or more nozzle(s) via which the cleaning liquid is sprayed.

Presently four high pressure tools 36 are provided, which have uniform angular distances from one another in the circumferential direction of the axis of rotation 48, i.e., in each case 90°. It is conceivable that a different number of high pressure tools 36 is provided, for example five or six high pressure tools 36. A replacement of the rotor 58 is also conceivable.

A respective high pressure tool 36 comprises a base portion 64 and a lance-shaped dispensing portion 66 that is fixed to the base portion 64. In the drawing, only one dispensing portion 66 is depicted as an example. The base portion 64 and the dispensing portion 66 together define a tool channel 68 for cleaning liquid to be dispensed, which tool channel 68 defines a tool axis 70. At the end on the dispensing portion 66, at least one opening is arranged, in particular in the form of a nozzle 72.

The high pressure tool 36 may advantageously engage, at least with the dispensing portion 66, into cavities of the workpiece 12 in order to internally clean same.

A tool holding part 74 is associated with a respective high pressure tool 36. The high pressure tool 36 is fixed to the rotor 58 by way of the tool holding part 74. The tool holding part 74 thereby covers the high pressure tool 36 and abuts against the rotor 58 in the manner of a flange.

The high pressure tool 36 is held by way of at least one bearing device so as to be rotatable relative to the tool holding part 74 about the tool axis 70. Presently two bearing devices 76, 78 are provided. The bearing device 76 is configured, in particular, as a tapered roller bearing 80. As a result, not only can a radial mounting of the high pressure tool 36 be achieved, but also an axial mounting. The bearing device 78 is presently a ball bearing.

The bearing devices 76, 78 are sealed by means of a sealing element 82 that is configured, e.g., as a shaft sealing ring 84.

Formed on the tool channel 68 at the entry side is a valve seat 86 that can cooperate with a valve body, as explained in the following. The valve seat 86 is presently a cone receptacle for a valve cone.

A desired high pressure tool 36 can be transferred from an inoperative position into an operating position by way of the adjusting device 34. In the operating position, the cleaning liquid provided by the pump unit 24 is dispensed by the corresponding high pressure tool 36, whereas in their inoperative position, the high pressure tools 36 are not acted upon with cleaning liquid.

In the drawing, the high pressure tool 36 arranged at the bottom on the rotor 58 adopts the operating position. "At the bottom" presently serves merely for explanation of the drawing and for better understanding of the invention. It is understood that depending on the orientation of the switching apparatus 14 in space, the high pressure tool 36 adopting the operating position may have a different positioning or orientation relative to the line of gravity.

The tool change by way of the rotor 58 may take place very quickly in the case of the switching apparatus 14, for example in about 0.4 s. The adjusting unit 54 can advantageously be switched into a passive state by way of the control device 30, such that the rotor 58 is freely rotatable to the holding device 32. This proves to be advantageous during the tool change, as was already explained above.

In order to rotate the high pressure tool 36 adopting the operating position about the tool axis 70, the switching apparatus 14 comprises a drive device 88 and a rotary body 90 that is rotationally drivable by said drive device 88.

The rotary body 90 is accommodated in a receptacle 92 of the base body 38 and is mounted by means of at least one bearing device so as to be rotatable relative to said base body 38 about an axis of rotation 94 defined by the rotary body. The rotary body 90 is presently mounted indirectly on the base body 38. As can be seen, in particular, in FIG. 8, the rotary body 90 is a constituent part of an assembly 96 that comprises a receiving part 98 accommodating the rotary body 90 and is inserted into the receptacle 92.

The receiving part 98 is of housing-like configuration and comprises, e.g., a first portion 100 and a second portion 102. The portions 100, 102 are arranged at a distance from one another and in their basic form are each of approximately cap-shaped or lid-shaped configuration. A receiving space 104 in which the rotary body 90 is predominantly accommodated is formed between the portions 100, 102. The rotary body 90 passes through an opening on the portion 102 and projects in the direction of the high pressure tool 36 adopting the operating position.

The rotary body 90 is rotatably mounted relative to the portion 100 by way of a bearing device 108 and relative to the portion 102 by way of a bearing device 110 and as a result thereof relative to the receiving part 98 by means of two bearing devices 108, 110. Because the receiving part 98 is inserted into the receptacle 92 so as to be secured against rotation, there is an indirect rotatable mounting of the rotary body 90 on the base body 38.

In the present case, there is also an axial mounting of the base body 90 in addition to the radial mounting. To this end, the bearing device 108 is presently configured as a tapered roller bearing 112.

The drive device 88 comprises a drive element 114, configured as a drive wheel and, in particular, as a toothed wheel, which surrounds the rotary body 90 and is coupled thereto in a rotationally fixed manner. The drive device 88 further comprises a drive element 116 that is rotatably mounted on the holding device 82 and a further drive element 118 that is non-rotatably coupled to a drive shaft of a drive unit 120 of the drive device 88. The drive unit 120 comprises, e.g., a stepping motor or servo motor.

The drive elements 114, 116, and 118 are drive wheels, in particular toothed wheels, wherein the drive unit drives the drive element 118 that meshes with the drive element 116, which in turn meshes with the drive element 114.

Figure 2:
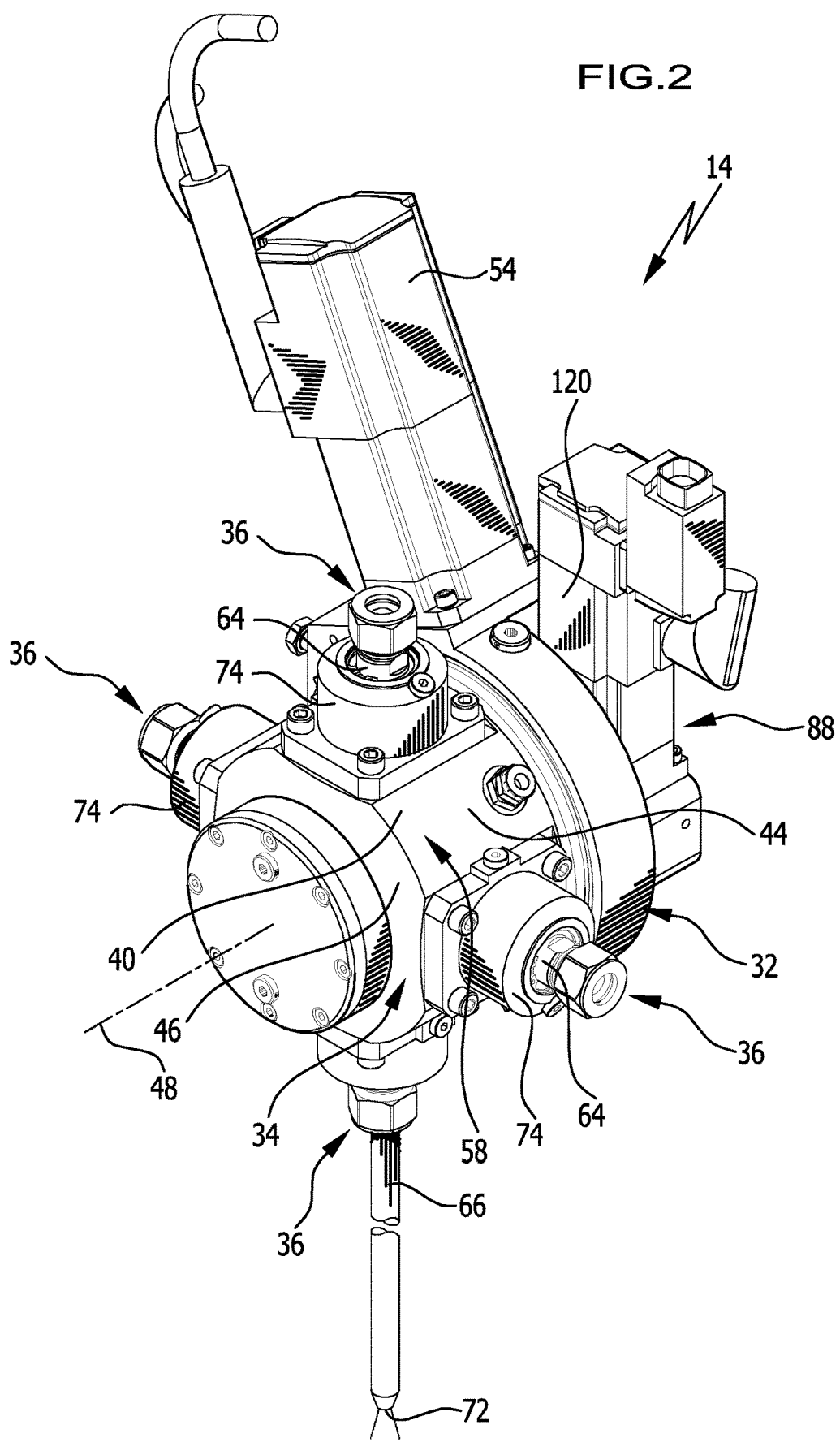
FIG. 2: shows a perspective depiction of the switching apparatus from FIG. 1.
Figure 3:
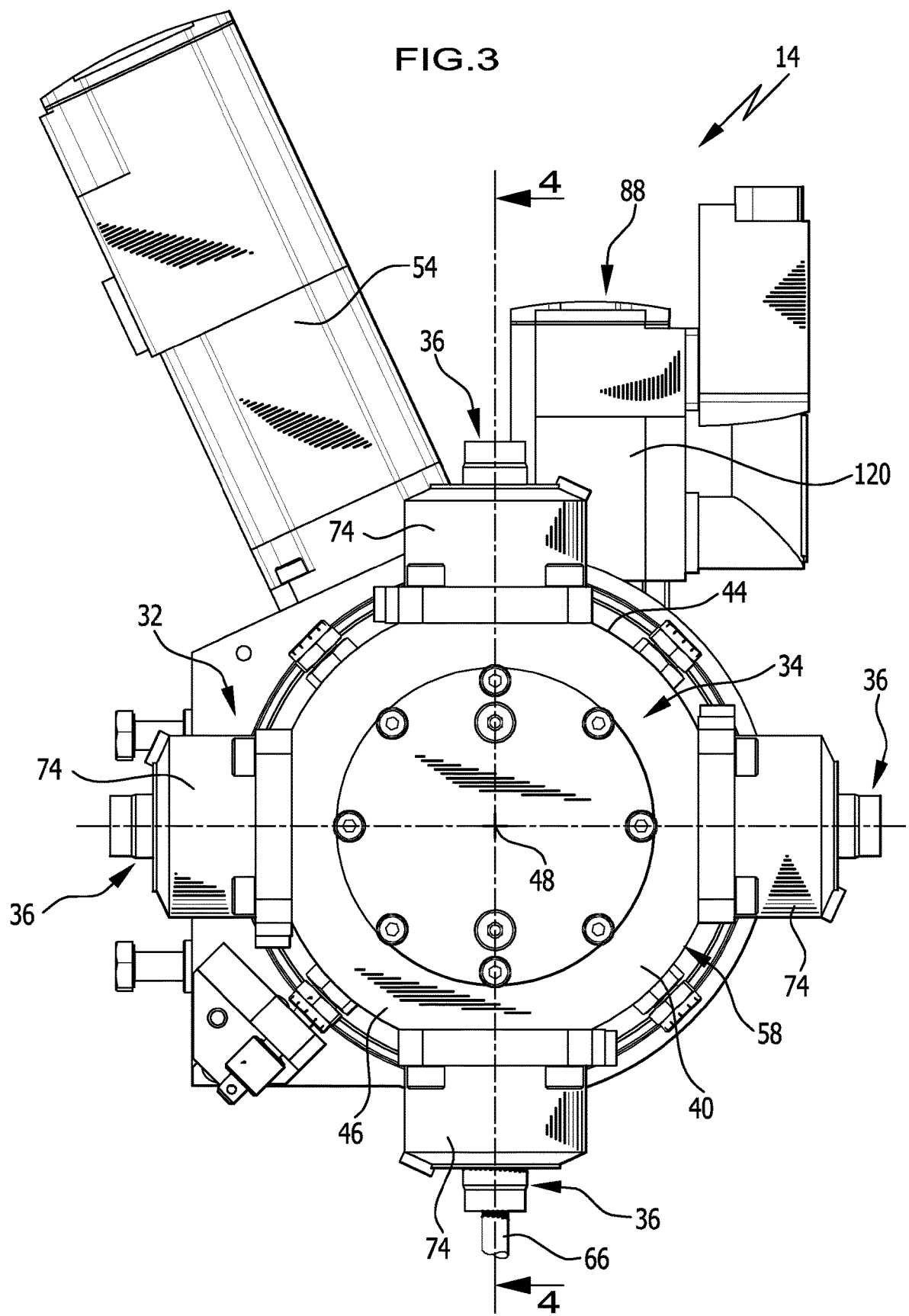
FIG. 3: shows a side view of the switching apparatus.
Figure 4:
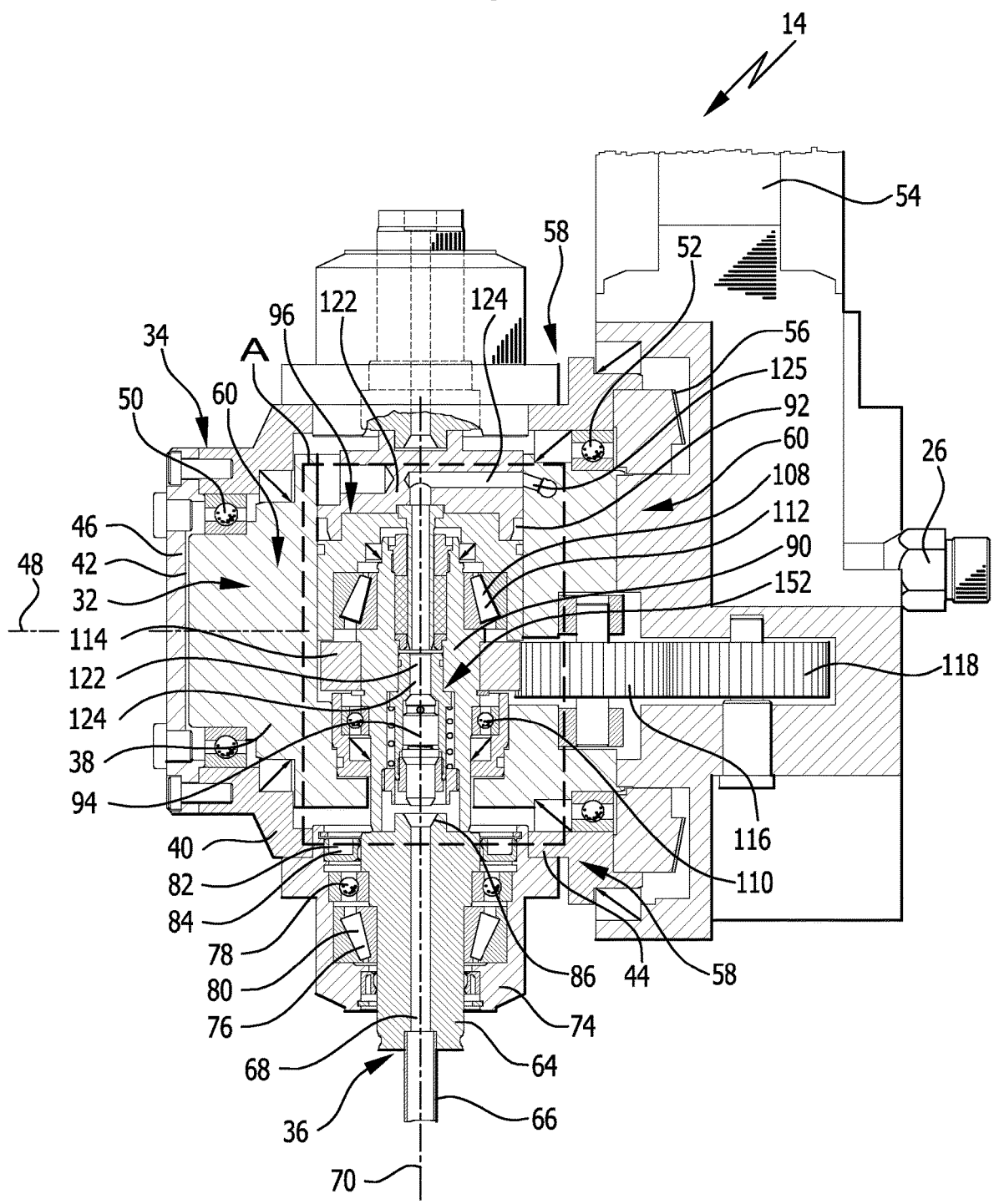
FIG. 4: shows a cut view of the switching apparatus along the line 4-4 in FIG. 3.

The drive shaft of the drive unit 120 is presently aligned in parallel to the axis of rotation 94, such that the switching apparatus 14 is of compact construction along the axis of rotation 48. For this purpose, it is advantageous that the drive unit 120 and the adjusting unit 54 are arranged in a common plane (FIG. 2).

The drive element 114 is presently a constituent part of the assembly 96 and is arranged between the portions 100, 102.

The rotary body 90 is of sleeve-shaped configuration and forms a portion 122 of a supply channel 124 for cleaning liquid. The supply channel 124 is an axial through-channel in the rotary body 90. A further portion 125 of the supply channel 124 is formed in the holding device 32 and extends, in particular, through the base body 38.

The rotary body 90 has a widened portion 126 in the flow direction of the cleaning liquid, at which widened portion 126 an abutment element 128 that is presently of annular configuration is formed. The abutment element 128 is a stop.

On a side 130 that faces toward the high pressure tool 36 adopting the operating position, the rotary body 90 comprises an engagement element 132. In the operating position of the high pressure tool 36, the base portion 64 thereof is in engagement with the engagement element 132, in particular by way of positive engagement. In this way, it is possible to transmit a rotation of the rotary body 90 to the high pressure tool 36, such that the latter can rotate about the tool axis 70.

During operation of the switching apparatus 14, rotational speeds of the high pressure tool 36 of up to about 3,000 revolutions per minute may be provided. The rotational speed can be set by the control device 30. Provision may be made, however, that the high pressure tool 36 does not rotate, depending on the application.

The bearing devices 108, 110 are sealed by means of a sealing device. In particular, a sealing element 134 is provided, which seals between the rotary body 90 and the receiving part 98 at its first portion 100, near the bearing device 108. The sealing element 134 is a shaft sealing ring 136.

A further sealing element 138, also configured as a shaft sealing ring 140, seals between the rotary body 90 and the receiving part 98 at its second portion 102, near the bearing device 110.

The assembly 96 inserted into the receptacle 92 is covered by a covering part 142 that forms the supply channel 124 in sections and closes the receptacle 92. An inflow sleeve 144 engaging into the rotary body 90 is fixed to the covering part 142 so as to be secured against rotation. A sealing device is provided, presently in the form of a high pressure sealing packing 146, by means of which the inflow sleeve 144 is sealed relative to the rotary body 90. The sealing packing 146 abuts against a stop element 148 on the rotary body 90 and is immovably fixed relative thereto by means of a holding element 150. The inflow sleeve 144 presently engages into the rotary body 90 approximately up to the stop element 148.

The switching apparatus 14 comprises a valve device 152 for unblocking and blocking the supply channel 124. The valve device 152 is arranged on the rotary body 90 and, in particular, is a constituent part of the assembly 96.

The valve device 152 is accommodated in the rotary body 90 and is coupled thereto in a rotationally fixed manner. In this way, sealing faces rotating relative to one another can preferably be avoided during a rotation of the high pressure tool 36.

In particular, the switching apparatus 14 has the advantage that for the multitude of high pressure tools 36 only one valve device 152 has to be provided, wherein respective valve devices associated with the high pressure tools 36 are not necessary. In this way, the number of required parts for the construction of the switching apparatus 14 can be reduced. This offers advantages with regard to manufacturing costs and assembly work. The maintenance of the switching apparatus 14 is simplified.

Figure 8:
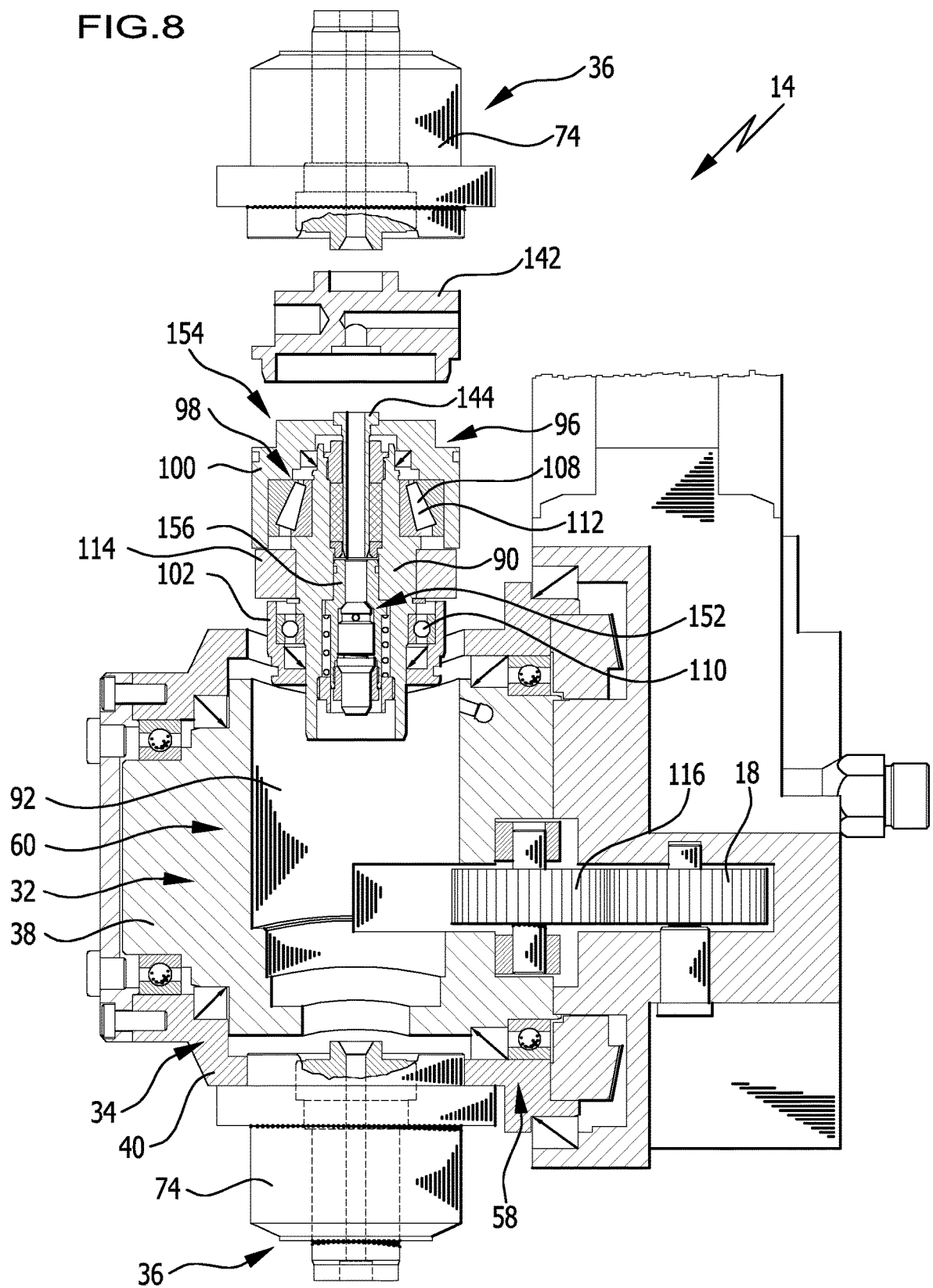
FIG. 8: shows a view corresponding to FIG. 4, partially in an exploded depiction.

It is favorable for the assembly and maintenance, in particular, that the preassembled assembly 96 is provided, which can be removed as a whole from the receptacle 92 after removal of a high pressure tool 36 and the covering part 142 (FIG. 8). During assembly, first the assembly 96 is inserted into the receptacle 92, then the covering part 142 and finally the high pressure tool 36 with the associated tool holding part 74 is fixed to the adjusting element 40.

The inflow sleeve 144 is part of the assembly 96 during the assembly. When fixing the inflow sleeve 144 by means of the covering part 142, the inflow sleeve 144 is non-rotatably fixed relative to the covering part 142. In contrast, the sealing packing 146 can rotate with the rotary body 90.

The assembly 96 offers, in particular, a rotary passage 154 for providing the sealed transition, even under high pressure, between the holding device 32 and the rotation of the high pressure tool 36 facilitated by way of the rotary body 90. It is advantageous, in particular, that only one rotary passage 154 is required for the plurality of high pressure tools 36, in a corresponding manner like in the case of the only one valve device 152.

Figure 5:
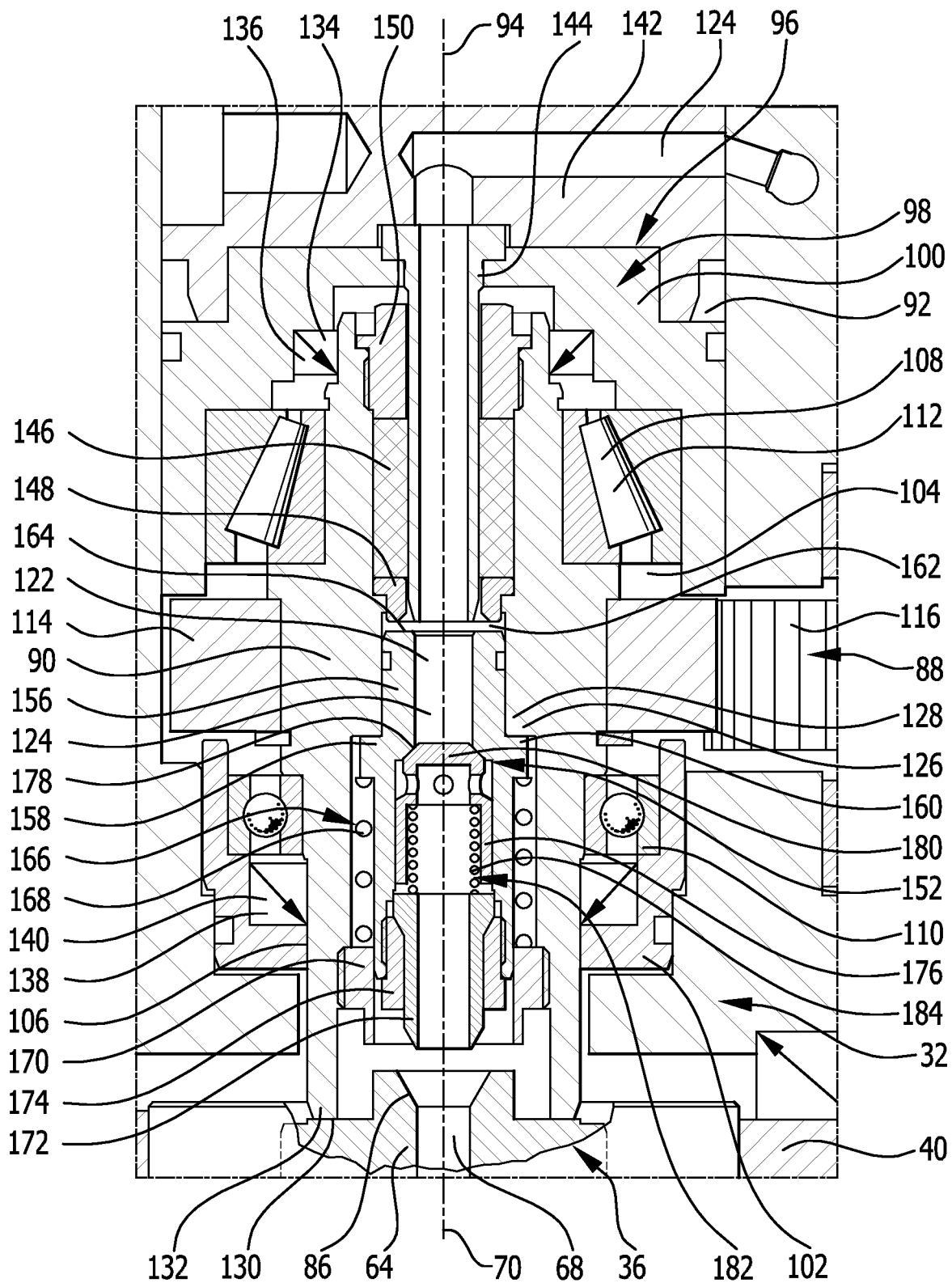
FIG. 5: shows an enlarged depiction of detail A in FIG. 4, without pressurization.
Figure 6:
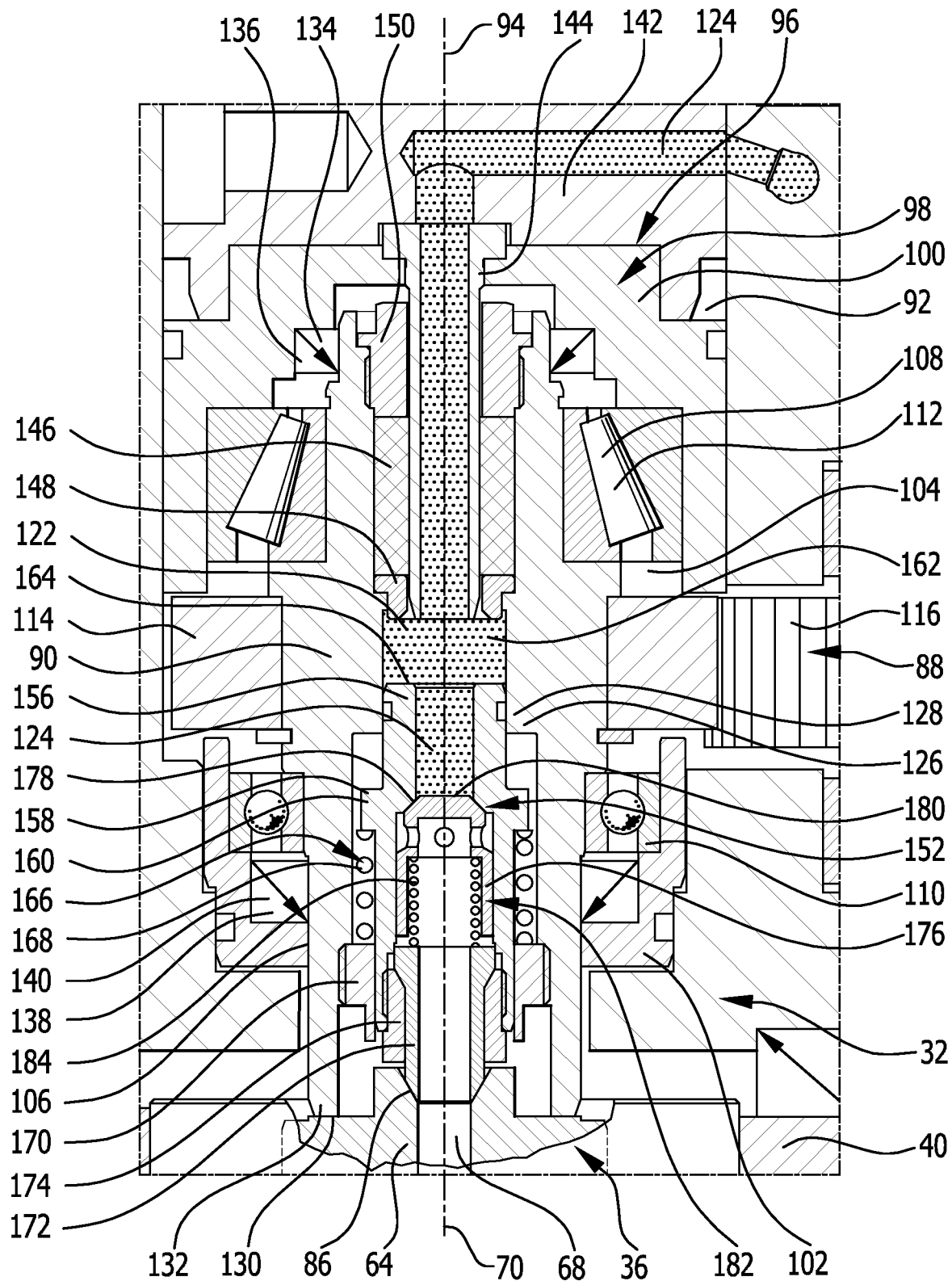
FIG. 6: shows a depiction corresponding to FIG. 5, wherein the cleaning liquid is under pre-pressure.
Figure 7:
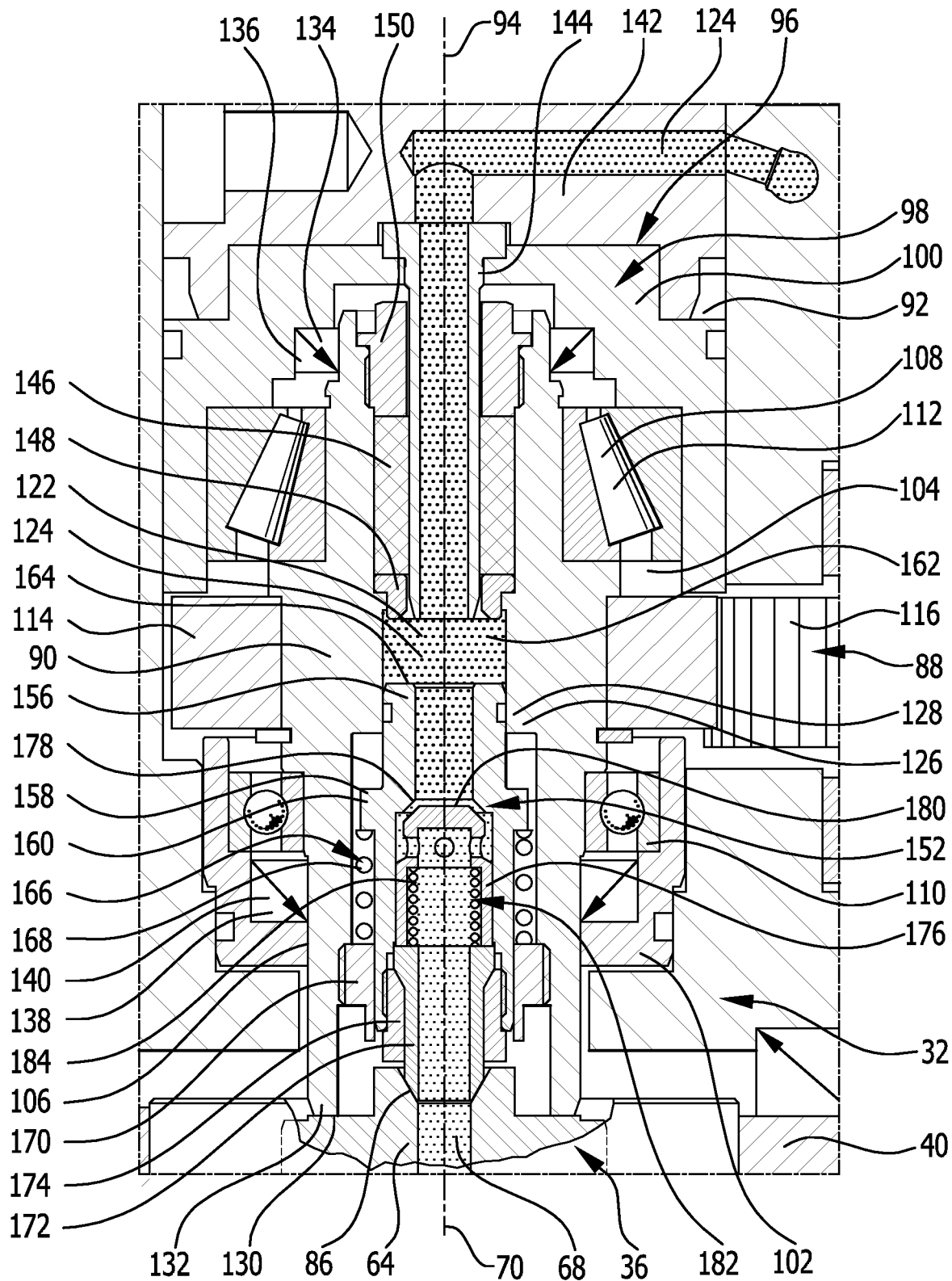
FIG. 7: shows a depiction corresponding to FIG. 6 after the pressure has risen to the operating pressure.

As is clear, in particular, in FIGS. 5 and 7, the valve device 152 comprises a control body 156. The control body 156 is of sleeve-shaped configuration and is accommodated in the rotary body 90. At a widened portion 158 of the control body 156, an abutment element 160 is formed, by way of which the control body 156 in a base position can abut against the abutment element 128 (FIG. 5).

In this case, an interspace 162 between a face side 164 of the control body 156 arranged upstream and the abutment element 148 is formed, such that an annular end face of the control body 156 can be acted upon with cleaning liquid.

The control body 156 is supported by means of a restoring device 166, comprising a restoring element 168 in the form of a coil spring, on a holding element 170, for example in the form of a screw-in sleeve, that is fixedly connected to the rotary body 90.

The control body 156 is a control piston that can be displaced axially relative to the rotary body 90 against the action of the restoring element 168.

Arranged on the control body 156 is a valve body 172 of the valve device 152 that is presently formed separately from the control body 156 and is connected thereto. For example, a holding element 174 in the form of a screwing sleeve is provided for fixing the valve body 172. The valve body 172 is formed corresponding to the valve seat 86 and comprises a sealing cone. The valve body 172 can cooperate with the valve seat 86 when the control body 156 is displaced in the direction of the high pressure tool 36.

The valve device 152 has a valve body 176 by way of which a pressure holding valve is presently formed, together with a corresponding valve seat 178 on the control body 156. The valve body 176 is configured as a piston, is arranged in the control body 156, and is configured to be movable, in particular displaceable, relative to said control body 156. On a face side 180 in the supply channel 124 arranged in the inflow direction, the valve body 176 can be acted upon with cleaning liquid. The end face is smaller than the end face of the control body 156. The valve body 176 is raised from the valve seat 178 only at higher pressure of the cleaning liquid than that pressure at which the control body 156 is displaced.

A restoring device 182 with a restoring element 184, presently in the form of a coil spring, acts upon the valve body 176 with a restoring force in the direction of the valve seat 178. The restoring element 184 is presently supported on the valve body 172.

The valve seat 178 is arranged in the region of the widened portion 158, on a side opposite the abutment element 160. The valve device 152 can thereby be given a compact structure axially and radially.

The rotary body 90, the control body 156, the valve body 172, and the valve body 176 are aligned coaxially to one another in relation to the axis of rotation 94.

In the correct desired position in the operating position, the high pressure tool 36 is aligned coaxially to the rotary body 90, wherein the tool axis 70 is in alignment with the axis of rotation 94 and the tool channel 68 is in alignment with the portion 122 of the supply channel 124.

When starting up the switching apparatus 14 or changing the high pressure tool 36, the valve device 28 is closed and/or the pump unit 24 is deactivated. With pressurization, the control body 156 adopts a base position in which the abutment elements 128, 160 abut against one another, under the action of the restoring element 168. The valve body 172 is spaced at a distance from the high pressure tool 36 guided into the operating position and, in particular, from the valve seat 86 thereof. The valve body 176 adopts a sealing position in which it sealingly abuts against the valve seat 178 and blocks the supply channel 124 under the effect of the restoring element 184 (FIG. 5).

When the pressure of the cleaning liquid rises when the fluid conduit 26 is unblocked, for example to a pre-pressure of about 5 bar to 10 bar, the control body 156 is displaced relative to the rotary body 90 axially in the direction toward the high pressure tool 36 (FIG. 6) and is transferred from the base position into an alignment position. The valve body 176 abutting against the valve seat 178 is also displaced, but maintains its sealing position.

In the alignment position, the valve body 172 comes into sealing abutment against the valve seat 86. The adjusting unit 54 is favorably briefly switched into a passive state, whereby a correct and reliable alignment of the high pressure tool 36 relative to the valve device 152 can be achieved. At the same time, a fluid-tight connection between the supply channel 124 and the tool channel 68 is ensured.

At an even higher pressure, in particular upon reaching the operating pressure of, e.g., about 600 bar, the valve body 176 is raised from the valve seat 178 and transferred into an unblocking position. Cleaning liquid flows past the valve seat 178 and through the valve body 176, 172 to the high pressure tool 36 (FIG. 7).

Even at operating pressure, the control body 156 is still acted upon with pressure. The fluid-tight connection at the valve seat 86 is thereby ensured even at high operating pressures.

The axial forces occurring in the region of the sealing cone are favorably absorbed by the tapered roller bearings 80, 112 set against one another.

When the pressure of the cleaning liquid is no longer being applied, the valve body 176 returns into the sealing position under the action of the restoring element 184. The control body 156 returns into the base position under the action of the restoring element 168.

Figure 9:
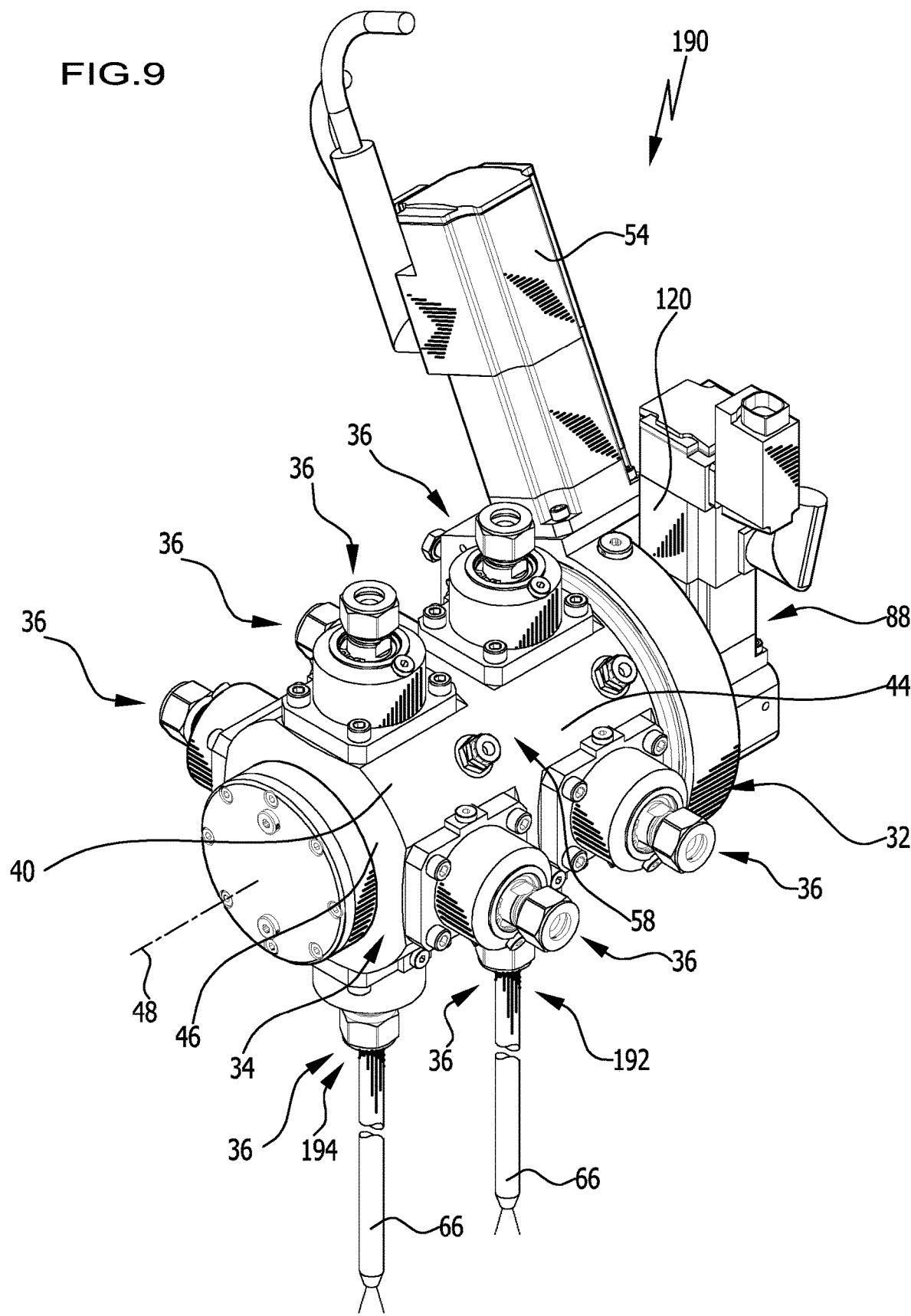
FIG. 9: shows a perspective depiction corresponding to FIG. 2 in a further preferred embodiment of the switching apparatus in accordance with the invention.
Figure 10:
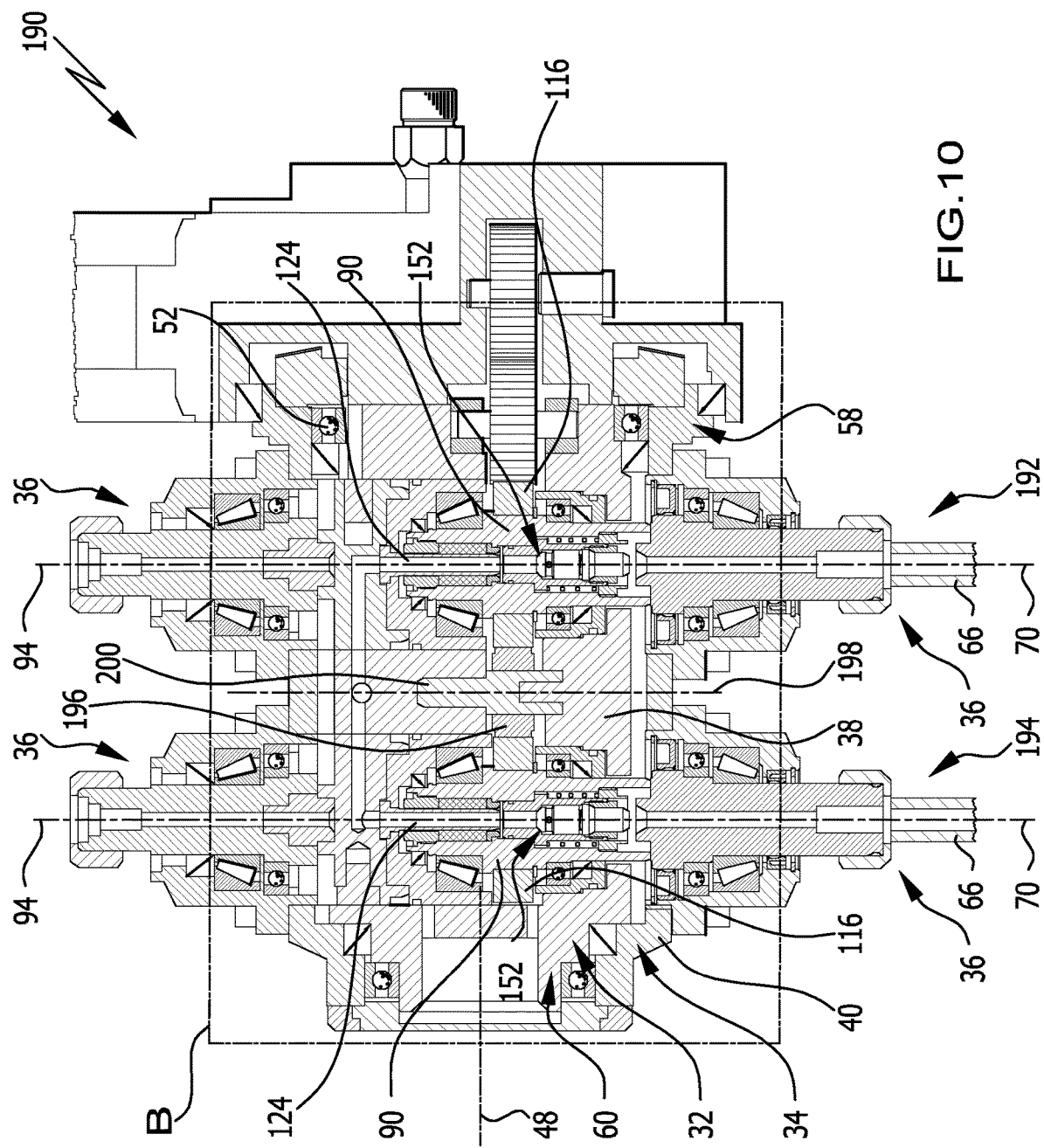
FIG. 10: shows a cut view of the switching apparatus from FIG. 9.
Figure 11:
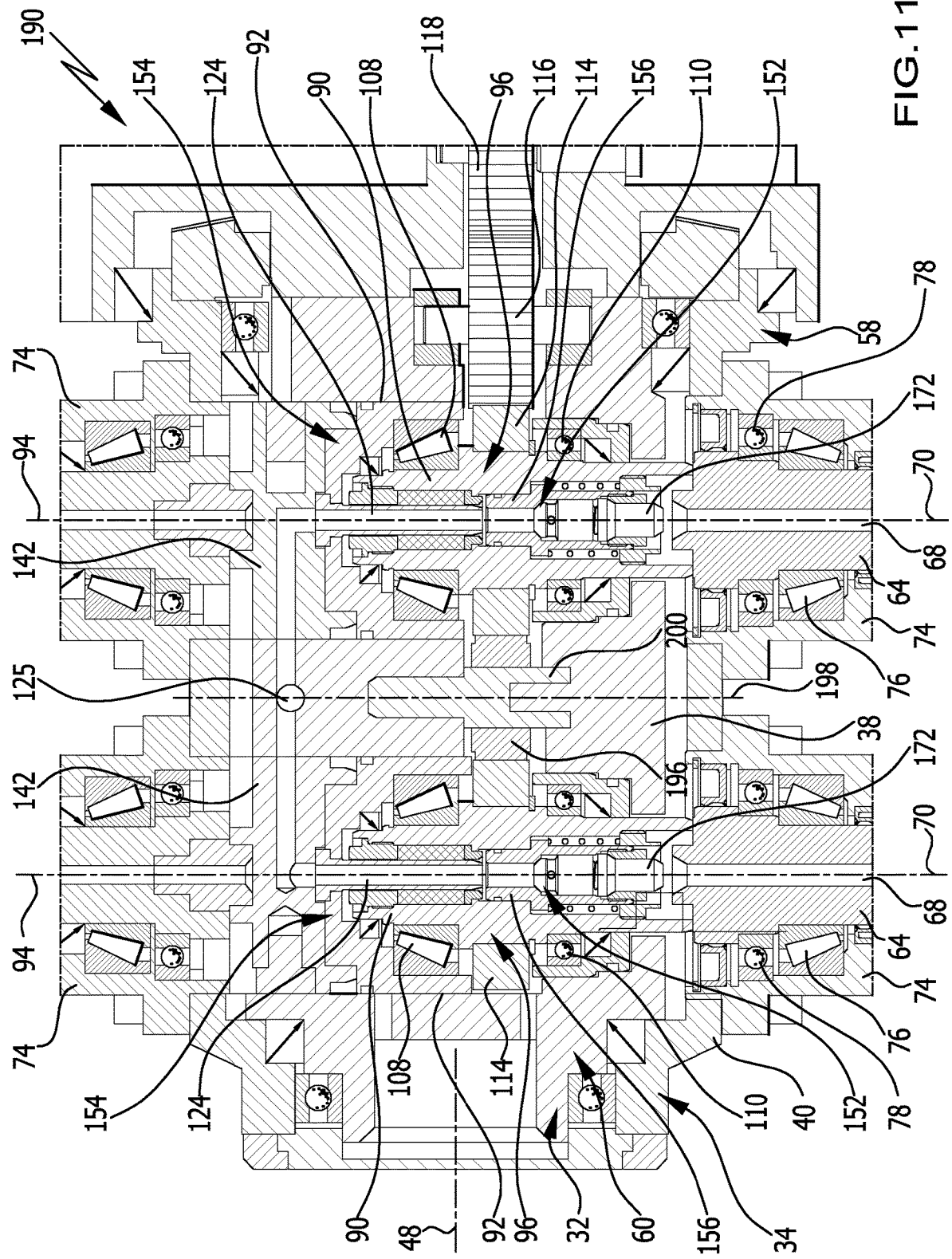
FIG. 11: shows an enlarged depiction of detail B in FIG. 10, like in FIG. 5 without pressurization.

FIGS. 9 to 11 show a further preferred embodiment of the switching apparatus in accordance with the invention, which is denoted as a whole with the reference numeral 190. The advantages that can achieved with the switching apparatus 14 can also be achieved with the switching apparatus 190, such that reference may be made to the preceding remarks in this regard in order to avoid repetition. Only the most significant differences are discussed in the following.

The switching apparatus 190 may be used as a constituent part of the cleaning apparatus 10 in place of the switching apparatus 14 or together therewith. Here, the switching apparatus 190 may be held, in particular, on the robotic arm 18 and be moved relative to the workpiece 12.

The following statements shows that a simultaneous machining of two workpieces 12 is preferably possible by means of the switching apparatus 190. To this end, the workpieces 12 are preferably jointly held on the receiving device 22.

Using the switching apparatus 190, the cycle time for the machining and/or cleaning of the workpieces 12 can be significantly reduced.

As can be seen in FIGS. 9 to 11, the switching apparatus 190 comprises the holding device 32, the adjusting device 34, and the drive device 88. The adjusting device 34 comprises the adjusting element 40 as a rotor 58. The rotor 58 is rotatable about the axis of rotation 48 relative to the stator 60 formed by the holding device 32.

In the case of the switching apparatus 190, the high pressure tools 36 explained thus far form a first group 192 of high pressure tools 36. Moreover, a second group 194 of high pressure tools 36 is provided. Compared to the switching apparatus 14, the number of high pressure tools 36, in particular, is doubled.

Each high pressure tool 36 of the first group 192 is associated with a high pressure tool 36 of the second group 194. The high pressure tools 36 of both groups 192, 194 are arranged laterally next to one another on the rotor 58 in relation to the axis of rotation 48. The high pressure tools 36 of both groups 192, 194 are arranged at the same position in the circumferential direction of the axis of rotation 48 (FIGS. 9 and 10).

Here, provision is made, in particular, that the high pressure tools 36 of both groups 192, 194 adopting the respective operating position are of identical configuration.

A second assembly 96 is associated with the high pressure tools 36 of the second group 194. For said second assembly 96, a further receptacle 92 is formed in the base body 38.

The further assembly 96 is configured identically to the assembly 96 described above and comprises, in particular, a further rotary body 90, a further valve device 152, and a further supply channel 124. Bearing devices 108, 110, the receiving part 98, and the drive element 114 are also provided. Reference is made to the above statements with regard to the further structure of the assembly 96.

The rotary bodies 90 are arranged such that the axes of rotation 94 are aligned in parallel to one another. The axis of rotation 94 of the further rotary body 90 coincides with the tool axis 70 of the high pressure tool 36 of the second group 194 adopting the respective operating position.

As a result thereof, the high pressure tools 36 of both groups 192, 194 adopting the respective operating position are aligned with tool axes 70 aligned in parallel to one another.

The supply channels 124 that extend in both rotary bodies 90 as axial through-channels open into one another upstream from the rotary bodies 90. Here, the supply channels 124 extend through the covering parts 142 and open into the portion 125 formed in the base body 38. Both supply channels 124 and thus the two high pressure tools 36 adopting the operating position can thereby be jointly acted upon with cleaning liquid by way of the fluid conduit 26.

Each assembly 96 has the drive element 114 configured as a drive wheel, in particular as a toothed wheel. The drive elements 116 of both assemblies 96 are coupled to one another. For this purpose, a further drive element 196 configured as a drive wheel, in particular as a toothed wheel, is used.

The drive element 196 is fixed on a shaft 200, which is fixed about an axis of rotation 198 in the base body 198, and is in engagement with both drive elements 114. Both rotary bodies 90 and thus both high pressure tools 36 of both groups 192, 194 adopting the operating position are rotated in the same direction of rotation about the respective axes 94, 70. The drive elements 114 are of identical configuration, such that the rotational speeds are identical.

The further assembly 96 can also be preassembled as a whole and inserted into the further receptacle 92 or be removed therefrom, as was described above, in particular with reference to FIG. 8.

The switching apparatus 190 can be implemented in a constructively simple manner compared to the switching apparatus 14 by the rotor 58 and the stator 60 being lengthened axially along the axis of rotation 48 and the additional receptacle 92 as well as the connections for the high pressure tools 36 being provided. Thus, the switching apparatus 190 also has a particularly compact structure.

To this end, in particular, it is advantageous that a further rotary passage 154 is formed by way of the further structural unit 96. Only one rotary passage 154 is required for the multitude of the high pressure tools 36 of the second group 194, as well.

REFERENCE NUMERAL LIST 10 cleaning apparatus
12 workpiece
14 switching apparatus
16 adjusting device
18 robotic arm
20 supporting surface
22 receiving device
24 pump unit
26 fluid conduit
28 valve device
30 control device
32 holding device
34 adjusting device
36 high pressure tool
38 base body
40 adjusting element
42 side
44 peripheral wall
46 top wall
48 axis of rotation
50 bearing device
52 bearing device
54 adjusting unit
56 toothing
58 rotor
60 stator 64 base portion
66 dispensing portion
68 tool channel
70 tool axis
72 nozzle
74 tool holding part
76 bearing device
78 bearing device
80 tapered roller bearing
82 sealing element
84 shaft sealing ring
86 valve seat
88 drive device
90 rotary body
92 receptacle
94 axis of rotation
96 assembly
98 receiving part
100 first portion
102 second portion
104 receiving space
106 opening
108 bearing device
110 bearing device
112 tapered roller bearing
114 drive element
116 drive element
118 drive element
120 drive unit
122 portion
124 supply channel
125 portion
126 widened portion
128 abutment element
130 side
132 engagement element
134 sealing element
136 shaft sealing ring
138 sealing element
140 shaft sealing ring
142 covering part
144 inflow sleeve
146 sealing packing
148 stop element
150 holding element
152 valve device
154 rotary passage
156 control body
158 widened portion
160 abutment element
162 interspace
164 face side
166 restoring device
168 restoring element
170 holding element
172 valve body
174 holding element
176 valve body
178 valve seat
180 face side
182 restoring device
184 restoring element
190 switching apparatus
192 first group
194 second group
196 drive element
198 axis of rotation
200 shaft

What is claimed is:

1. Switching apparatus for high pressure tools, comprising a holding device and two or more high pressure tools for cleaning purposes, a drive device and a rotary body that is rotatable relative to the holding device about an axis of rotation by means of said drive device, an adjusting device with which one of the high pressure tools is selectively transferable from an inoperative position into an operating position, in which operating position the high pressure tool is coupled to the rotary body in a rotationally fixed manner and is rotationally drivable about a tool axis by way of said rotary body, wherein the switching apparatus comprises or forms a supply channel for pressurized cleaning liquid and the respective high pressure tool comprises or forms a tool channel for cleaning liquid, which is in flow connection or can be brought into flow connection with the supply channel during operation, wherein the switching apparatus further comprises a valve device with which the supply channel is selectively unblockable and closable, wherein the supply channel is formed in the rotary body at least in sections and the valve device is arranged on the rotary body.

2. Switching apparatus in accordance with claim 1, wherein in the operating position of the respective high pressure tool, the adjusting device holding the high pressure tool is locked and held in position by means of the valve device.

3. Switching apparatus in accordance with claim 1, wherein the switching apparatus comprises a rotary passage for cleaning liquid from the holding device to the high pressure tool, wherein the rotary passage with the valve device arranged on the rotary body is unblockable in a targeted manner for supplying cleaning liquid or blockable.

4. Switching apparatus in accordance with claim 1, wherein the valve device is comprised by the rotary body or is at least partially arranged in the rotary body.

5. Switching apparatus in accordance with claim 1, wherein the rotary body is aligned coaxially to the high pressure tool in the operating position thereof.

6. Switching apparatus in accordance with claim 1, wherein the valve device comprises a control body that is movable relative to the rotary body and in a base position closing the supply channel abuts against an abutment element of the rotary body and in an alignment position is raised from the abutment element, wherein the control body comprises or forms a valve body or such a one is arranged on the control body, which valve body in the alignment position of the control body sealingly abuts against a valve seat of the tool channel and in the base position is raised from said valve seat.

7. Switching apparatus in accordance with claim 6, wherein the control body is transferable from the sealing position into the alignment position against the action of a restoring device.

8. Switching apparatus in accordance with claim 6, wherein the valve device comprises or forms a valve body that is movable relative to the control body, wherein the valve body in a sealing position closing the supply channel sealingly or substantially sealingly abuts against a valve seat of the control body and in an unblocking position is raised from the valve seat so as to unblock the supply channel.

9. Switching apparatus in accordance with claim 8, wherein the valve body is transferable into the unblocking position by means of pressurized cleaning liquid, wherein a higher pressure of the cleaning liquid is required for this than for transferring the control body from the base position into the alignment position.

10. Switching apparatus in accordance with claim 8, wherein the valve body adopting the sealing position abuts against the valve seat of the control body when said valve body is moved relative to the rotary body from the base position into the alignment position.

11. Switching apparatus in accordance with claim 8, wherein the valve body is transferable from the sealing position into the unblocking position against the action of a restoring device.

12. Switching apparatus in accordance with claim 1, wherein the switching apparatus comprises at least one bearing device, wherein the rotary body is directly or indirectly mounted by way of the at least one bearing device so as to be rotatable relative to the holding device.

13. Switching apparatus in accordance with claim 1, wherein the switching apparatus comprises at least one bearing device, wherein the high pressure tool is directly or indirectly mounted by way of the at least one bearing device so as to be rotatable relative to the adjusting device.

14. Switching apparatus in accordance with claim 1, wherein at least one bearing device comprises or forms at least one of a radial bearing and an axial bearing relative to at least one of the axis of rotation and the tool axis.

15. Switching apparatus in accordance with claim 1, wherein a first bearing device and a second bearing device are provided, which are configured as or comprise axial bearings set against one another.

16. Switching apparatus in accordance with claim 1, wherein the drive device comprises a drive element that is coupled to the rotary body in a rotationally-fixed manner and can be acted upon with a driving force by way of a drive unit.

17. Switching apparatus in accordance with claim 1, wherein the holding device comprises a base body in which a receptacle for the rotary body and the valve device is formed, and wherein the rotary body is directly or indirectly rotatably mounted relative to the base body by way of at least one bearing device.

18. Switching apparatus in accordance with claim 17, wherein the switching apparatus comprises a receiving part that accommodates the rotary body, the valve device, and the at least one bearing device, which together with the receiving part form a pre-assembled assembly that is removable as a whole from the receptacle or is insertable as a whole into same.

19. Switching apparatus in accordance with claim 1, wherein the two or more high pressure tools form a first group of high pressure tools of the switching apparatus, and wherein the switching apparatus comprises a further group of two or more high pressure tools, with which a further rotary body that is rotatable relative to the holding device about a further axis of rotation by means of the drive device is associated, wherein one of the high pressure tools of the further group of high pressure tools is selectively transferable from an inoperative position into an operating position by means of the adjusting device, in which operating position the high pressure tool is coupled to the further rotary body in a rotationally fixed manner and is rotationally drivable about a further tool axis by way of said rotary body, wherein the switching apparatus comprises or forms a further supply channel for pressurized cleaning liquid and the respective high pressure tool of the further group of high pressure tools comprises or forms a tool channel for cleaning liquid, which is in flow connection or can be brought into flow connection with the further supply channel during operation, wherein the switching apparatus further comprises a further valve device with which the further supply channel is selectively unblockable and closable, wherein the further supply channel is formed in the further rotary body at least in sections and the further valve device is arranged on the further rotary body.

20. Cleaning apparatus, comprising at least one switching apparatus and a pump unit that is in flow connection or is bringable into flow connection with the supply channel of the switching apparatus, the switching apparatus comprising a holding device and two or more high pressure tools for cleaning purposes,
- a drive device and a rotary body that is rotatable relative to the holding device about an axis of rotation by means of said drive device,
- an adjusting device with which one of the high pressure tools is selectively transferable from an inoperative position into an operating position, in which operating position the high pressure tool is coupled to the rotary body in a rotationally fixed manner and is rotationally driveable about a tool axis by way of said rotary body,
- wherein the switching apparatus comprises or forms a supply channel for pressurized cleaning liquid and the respective high pressure tool comprises or forms a tool channel for cleaning liquid, which is in flow connection or can be brought into flow connection with the supply channel during operation,
- wherein the switching apparatus further comprises a valve device with which the supply channel is selectively unblockable and closable,
- wherein the supply channel is formed in the rotary body at least in sections and the valve device is arranged on the rotary body.

* * * * *